(12) United States Patent
Cleverdon et al.

(10) Patent No.: US 8,920,755 B2
(45) Date of Patent: Dec. 30, 2014

(54) CONVERSION OF HF ALKYLATION UNITS FOR IONIC LIQUID CATALYZED ALKYLATION PROCESSES

(75) Inventors: Robert Fletcher Cleverdon, Walnut Creek, CA (US); Christine Marie Phillips, Pleasant Hill, CA (US); Hye Kyung Cho Timken, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 273 days.

(21) Appl. No.: 13/230,767

(22) Filed: Sep. 12, 2011

(65) Prior Publication Data

US 2013/0066132 A1    Mar. 14, 2013

(51) Int. Cl.
| | | |
|---|---|---|
| *B01J 19/00* | (2006.01) | |
| *B23P 17/04* | (2006.01) | |
| *B01J 31/02* | (2006.01) | |
| *C10G 35/04* | (2006.01) | |
| *C10G 50/00* | (2006.01) | |
| *C10G 69/08* | (2006.01) | |
| *C10G 69/12* | (2006.01) | |

(52) U.S. Cl.
CPC ............. *B01J 19/00* (2013.01); *B23P 17/04* (2013.01); *B01J 31/0284* (2013.01); *B01J 31/0288* (2013.01); *B01J 31/0289* (2013.01); *C10G 35/04* (2013.01); *C10G 50/00* (2013.01); *C10G 69/08* (2013.01); *C10G 69/123* (2013.01); *B01J 2231/4205* (2013.01); *C10G 2300/1037* (2013.01)
USPC ........... 422/608; 422/600; 422/610; 422/187; 585/721

(58) Field of Classification Search
USPC .................. 422/600, 608, 610, 187; 585/721
See application file for complete search history.

(56) References Cited

U.S. PATENT DOCUMENTS

| | | | | |
|---|---|---|---|---|
| 4,218,575 | A | * | 8/1980 | Webb, Jr. ...................... 585/715 |
| 5,284,990 | A | | 2/1994 | Peterson et al. |
| 7,432,408 | B2 | | 10/2008 | Timken et al. |
| 7,572,943 | B2 | | 8/2009 | Elomari et al. |
| 2011/0155640 | A1 | | 6/2011 | Timken et al. |

FOREIGN PATENT DOCUMENTS

| | | | |
|---|---|---|---|
| WO | WO2009085449 | | 7/2009 |
| WO | WO2011015662 | | 2/2011 |
| WO | WO2011015664 | * | 2/2011 |

OTHER PUBLICATIONS

Liu et al., "Ionic liquid alkylation process produces high-quality gasoline," *Oil & Gas Journal*, 2006, vol. 104, Issue 40.
PCT International Search Report, PCT/US/2012/043809, filed Jun. 22, 2012, Mail Date: Mar. 21, 2013.

* cited by examiner

*Primary Examiner* — Lessanework Seifu
(74) *Attorney, Agent, or Firm* — Steven H. Roth (57) ABSTRACT

Methods for converting an $H_2SO_4$ alkylation unit to an ionic liquid alkylation system configured for performing ionic liquid catalyzed alkylation processes may comprise connecting at least one component configured for ionic liquid catalyzed alkylation to at least one component of the $H_2SO_4$ alkylation unit, wherein the at least one component of the $H_2SO_4$ alkylation unit is retained, modified or adapted for use in the ionic liquid alkylation system. Ionic liquid catalyzed alkylation systems derived from existing conventional alkylation units, and ionic liquid catalyzed alkylation processes are also disclosed.

19 Claims, 5 Drawing Sheets

CONVERSION OF HF ALKYLATION UNITS FOR IONIC LIQUID CATALYZED ALKYLATION PROCESSES

TECHNICAL FIELD

The present invention relates to the conversion of sulfuric acid alkylation units for ionic liquid catalyzed alkylation processes.

BACKGROUND

Concentrated sulfuric acid ($H_2SO_4$) is widely used as a catalyst in industrial processes, such as olefin and isoparaffin alkylation. However, there are serious drawbacks to the use of $H_2SO_4$ in industrial process plants. Concentrated $H_2SO_4$ is extremely hazardous if inhaled, very hazardous in the case of skin or eye contact, and is considered a proven human carcinogen by IARC and OSHA.

In alkylation processes, $H_2SO_4$ is continuously diluted by the production of acid soluble oils, necessitating withdrawal and reprocessing of large volumes of the spent acid to restore catalytic activity. This reprocessing is typically performed by combusting and re-concentrating the acid in a separate processing plant. In many cases, the spent acid must be transported to the processing plant by tank trucks or rail cars, thereby creating a potential public exposure hazard due to road or rail accidents.

Efforts to develop safer, alternative catalysts in lieu of $H_2SO_4$ have encountered serious challenges, however. Hydrofluoric acid (HF) may be used as an alternative, although HF presents even greater hazards to humans than $H_2SO_4$. Further, solid alkylation catalysts have proved difficult to commercialize due to rapid fouling and deactivation.

Figure 1A:
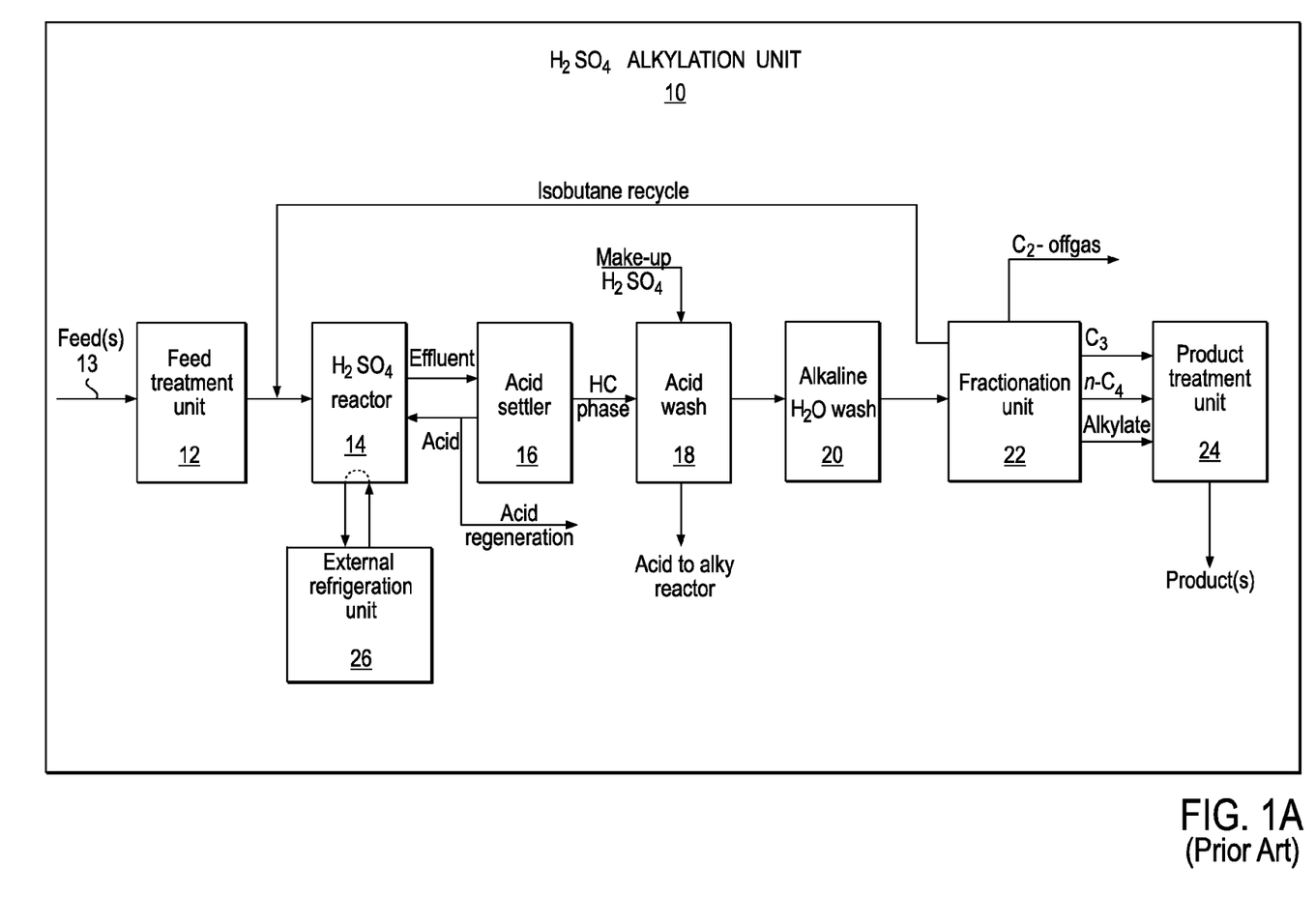
FIG. 1A is a block diagram schematically representing a sulfuric acid alkylation unit using conventional refrigeration, according to the prior art.

FIG. 1A is a block diagram schematically representing a conventional $H_2SO_4$ alkylation unit 10, according to the prior art. $H_2SO_4$ alkylation unit 10 may include a hydrocarbon feed line 13, an $H_2SO_4$ alkylation reactor 14, and an acid settler 16 coupled to $H_2SO_4$ reactor 14 for separating an acid/hydrocarbon mixture into a hydrocarbon phase and an acid phase. The acid phase may be recycled to $H_2SO_4$ reactor 14. Alkylation unit 10 may further include an acid wash vessel 18, an alkaline water wash vessel 20, a fractionation unit 22, a product treatment unit 24, and an external refrigeration unit 26. External refrigeration unit 26 uses a conventional refrigerant, such as Freon or propane, for cooling reactor 14. Fractionation unit 22, which contains multiple distillation or fractionation columns, fractionates the hydrocarbon phase to provide one or more products for treatment by product treatment unit 24. In some instances, a conventional alkylation unit may include a feed treatment unit 12 for treating the hydrocarbon feed(s) to reactor 14.

Figure 1B:
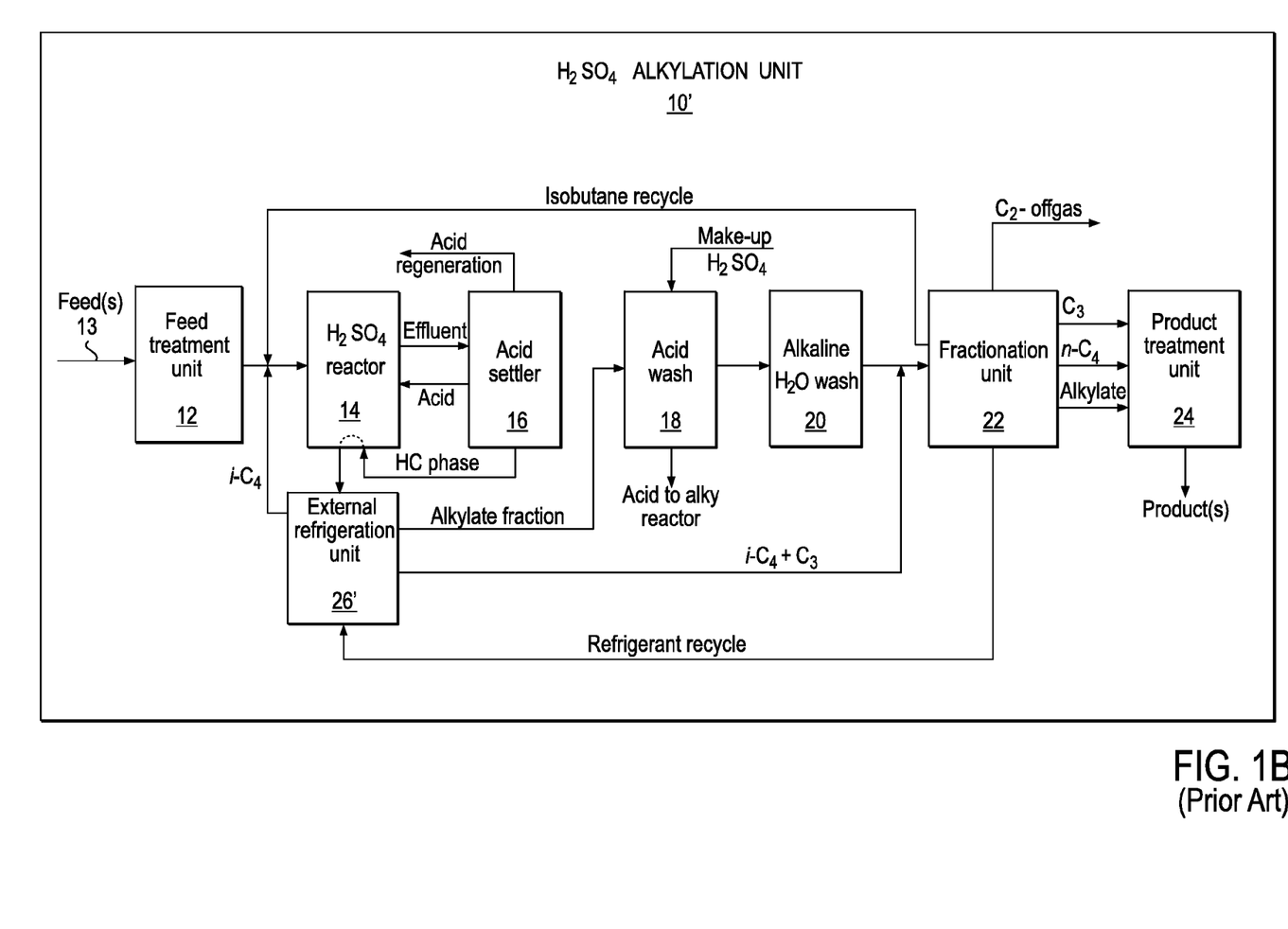
FIG. 1B is a block diagram schematically representing a sulfuric acid alkylation unit using effluent refrigeration, also according to the prior art.

FIG. 1B is a block diagram schematically representing a conventional $H_2SO_4$ alkylation unit 10', also according to the prior art. Alkylation unit 10' may include a hydrocarbon feed line 13, $H_2SO_4$ alkylation reactor 14, acid settler 16, acid wash vessel 18, alkaline water wash vessel 20, fractionation unit 22, and product treatment unit 24, substantially as described with reference to FIG. 1A. In contrast to unit 10 of FIG. 1A, alkylation unit 10' includes an effluent refrigeration unit 26' that uses effluent from the alkylation reactor as the refrigerant.

U.S. Pat. No. 5,284,990 to Peterson et al. discloses a method for converting an HF alkylation unit to a $H_2SO_4$ alkylation unit. The disclosure of the '990 patent is incorporated by reference herein in its entirety for all purposes.

The quest for an alternative catalytic system to replace conventional $H_2SO_4$ and HF catalysts in alkylation processes has been researched by various groups in both academic and industrial institutions. Thus far, no viable replacement catalyst for performing such processes has been commercialized.

Recently there has been considerable interest in metal halide ionic liquid catalysts as alternatives to $H_2SO_4$ and HF catalysts. As an example, the ionic liquid catalyzed alkylation of isoparaffins with olefins is disclosed in U.S. Pat. No. 7,432,408 to Timken, et al. Further, U.S. Pat. No. 7,572,943 to Elomari, et al. discloses the ionic liquid catalyzed oligomerization of olefins and the alkylation of the resulting oligomers(s) with isoparaffins to produce alkylated olefin oligomers.

PCT Publication No. WO 2011/015664 discloses a method for revamping an $H_2SO_4$ or HF alkylation unit to an ionic liquid alkylation unit, wherein one or more cyclone units are provided to promote the separation of ionic liquid from hydrocarbons.

Liu et al. (*Oil & Gas Journal* (2006) Vol. 104, Issue 40) describe retrofitting an $H_2SO_4$ alkylation unit for use in composite ionic liquid catalyzed alkylation by modifying the settler internals to enhance the separation of the composite ionic liquid from alkylate gasoline, and by providing a surge tank, wherein the composite ionic liquid is recycled from the surge tank to a STRATCO® (continuous stirred tank) reactor.

There is a need for the efficient and cost-effective conversion of existing, conventional $H_2SO_4$ alkylation units into ionic liquid alkylation systems suitable for ionic liquid catalyzed alkylation processes.

SUMMARY

In an embodiment, there is provided a method for converting a sulfuric acid alkylation unit to an ionic liquid alkylation system, the method comprising providing an ionic liquid specific sub-system comprising an ionic liquid alkylation reactor, and connecting at least one component of the ionic liquid specific sub-system to at least one component of the sulfuric acid alkylation unit.

In another embodiment, there is provided a method for converting a conventional alkylation unit to an ionic liquid alkylation system, the conventional alkylation unit including a fractionation unit, and the method comprising providing an ionic liquid alkylation reactor configured for ionic liquid catalyzed alkylation reactions, and connecting the ionic liquid alkylation reactor to at least one component of the conventional alkylation unit.

According to a further embodiment, there is provided a method for converting a sulfuric acid alkylation unit to an ionic liquid alkylation system, the sulfuric acid alkylation unit including a conventional fractionation unit, and the method comprising providing an ionic liquid alkylation reactor configured for ionic liquid catalyzed alkylation reactions, providing an ionic liquid/hydrocarbon separation unit configured for separating an alkylation reactor effluent of the ionic liquid alkylation reactor into an ionic liquid phase and a hydrocarbon phase, connecting the ionic liquid alkylation reactor to the ionic liquid/hydrocarbon separation unit for feeding the alkylation reactor effluent to the ionic liquid/hydrocarbon separation unit, and modifying the conventional fractionation unit to provide a modified fractionation unit, such that the modified fractionation unit is configured for separating an HCl-rich $C_{3-}$ fraction from at least a portion of the hydrocarbon phase.

In still a further embodiment, there is provided an ionic liquid alkylation system derived from an existing, conventional alkylation unit having a conventional fractionation unit, the ionic liquid alkylation system comprising an ionic liquid alkylation reactor configured for ionic liquid catalyzed alkylation reactions; an ionic liquid/hydrocarbon separation unit, in fluid communication with the ionic liquid alkylation reactor, for separating an alkylation reactor effluent of the ionic liquid alkylation reactor into an ionic liquid phase and a hydrocarbon phase; and a modified fractionation unit in fluid communication with the ionic liquid/hydrocarbon separation unit. The modified fractionation unit is derived from the conventional fractionation unit, and the conventional fractionation unit is modified such that the modified fractionation unit is configured for separating an HCl-rich $C_{3-}$ fraction from the hydrocarbon phase. The ionic liquid alkylation system is configured for recycling the HCl-rich $C_{3-}$ fraction to the ionic liquid alkylation reactor.

In yet another embodiment, there is provided an ionic liquid catalyzed alkylation process, comprising contacting at least one isoparaffin and at least one olefin with an ionic liquid catalyst in an ionic liquid alkylation zone under ionic liquid catalyzed alkylation conditions; separating a hydrocarbon phase from a reactor effluent of the ionic liquid alkylation zone; flashing at least a portion of the hydrocarbon phase; exchanging heat between the flashed hydrocarbon phase and the ionic liquid alkylation zone such that heat is removed from the ionic liquid alkylation zone by the flashed hydrocarbon phase; separating, via an effluent refrigeration unit, the flashed hydrocarbon phase into a plurality of hydrocarbon streams; fractionating at least one of the hydrocarbon streams to provide an HCl-rich $C_{3-}$ fraction; and recycling the HCl-rich $C_{3-}$ fraction to the ionic liquid alkylation zone.

As used herein, the terms "comprising" and "comprises" mean the inclusion of named elements or steps that are identified following those terms, but not necessarily excluding other unnamed elements or steps.

DETAILED DESCRIPTION

Ionic liquid catalysts may be useful for a range of hydrocarbon conversion reactions, including alkylation reactions for the production of alkylate gasoline blending components, distillate, lubricants, and the like. Conventional $H_2SO_4$ and HF alkylation units, per se, are not suitable for performing ionic liquid catalyzed alkylation processes. However, according to embodiments of the present invention, one or more components of a conventional $H_2SO_4$ alkylation unit may be used, or adapted for use, in ionic liquid alkylation systems and processes.

In an embodiment, the present invention provides methods for converting existing, conventional alkylation units into ionic liquid alkylation systems configured for efficiently performing ionic liquid catalyzed alkylation processes. Such plant conversions may be highly cost-effective during the commercialization of ionic liquid catalyzed alkylation processes. In another embodiment, there is provided an ionic liquid alkylation system derived from a conventional, existing or prior $H_2SO_4$ alkylation unit.

The disclosure of the commonly assigned U.S. patent application entitled "Conversion of HF alkylation units for ionic liquid catalyzed alkylation processes," filed on even date herewith, is incorporated by reference herein in its entirety.

Feedstocks for Ionic Liquid Catalyzed Processes

In an embodiment, feeds for ionic liquid catalyzed hydrocarbon conversion processes may comprise various streams in a petroleum refinery, a gas-to-liquid conversion plant, a coal-to-liquid conversion plant, or in naphtha crackers, middle distillate crackers, or wax crackers, including FCC off-gas, FCC light naphtha, coker off-gas, coker naphtha, hydrocracker naphtha, and the like. In an embodiment, such streams may contain isoparaffin(s) and/or olefin(s).

Examples of olefin containing streams include FCC off-gas, coker gas, olefin metathesis unit off-gas, polyolefin gasoline unit off-gas, methanol to olefin unit off-gas, FCC light naphtha, coker light naphtha, Fischer-Tropsch unit condensate, and cracked naphtha. Some olefin containing streams may contain two or more olefins selected from ethylene, propylene, butylenes, pentenes, and up to $C_{10}$ olefins. Such olefin containing streams are further described, for example, in U.S. Pat. No. 7,572,943, the disclosure of which is incorporated by reference herein in its entirety.

Examples of isoparaffin containing streams include, but are not limited to, FCC naphtha, hydrocracker naphtha, coker naphtha, Fisher-Tropsch unit condensate, and cracked naphtha. Such streams may comprise a mixture of two or more isoparaffins. In a sub-embodiment, an isoparaffin feed for an ionic liquid catalyzed process may comprise isobutane, which may be obtained, for example, from a hydrocracking unit, a butane isomerization unit, or may be purchased.

In an embodiment, olefins and isoparaffins in the feed(s) may participate in ionic liquid catalyzed isoparaffin-olefin alkylation reactions. In another embodiment, olefins in the feed(s) may undergo oligomerization when contacted with an ionic liquid catalyst in a hydrocarbon conversion reactor. Ionic liquid catalyzed olefin oligomerization may take place under the same or similar conditions as ionic liquid catalyzed olefin-isoparaffin alkylation. Ionic liquid catalyzed olefin oligomerization and olefin-isoparaffin alkylation are disclosed, for example, in commonly assigned U.S. Pat. Nos. 7,572,943 and 7,576,252, both to Elomari, et al., the disclosures of which are incorporated by reference herein in their entirety.

Methods for Converting a Conventional Alkylation Unit into an Ionic Liquid Alkylation System Conventional sulfuric acid alkylation units are schematically represented in FIGS. 1A and 1B, supra. For various reasons, e.g., due to differences in the physical and chemical properties of the ionic liquid catalyst, the optimum process conditions in the alkylation reactor and the process requirements for ionic liquid catalyzed alkylation, conventional sulfuric acid alkylation units, per se, are unsuitable for the commercialization of ionic liquid catalyzed alkylation processes. However, an existing sulfuric acid alkylation unit may be converted into an ionic liquid catalyst alkylation system configured for effectively performing ionic liquid catalyzed alkylation processes. The ionic liquid catalyst alkylation system may also be referred to herein as an ionic liquid alkylation system.

The conversion of an existing or prior sulfuric acid ($H_2SO_4$) alkylation unit to an ionic liquid (IL) alkylation system may be referred to herein as an "$H_2SO_4$/IL conversion." Such conversions may be realized, for example, by replacing and/or disconnecting one or more components of an $H_2SO_4$ alkylation unit, by adapting one or more components of the $H_2SO_4$ alkylation unit for ionic liquid catalyzed alkylation processes, and/or by connecting one or more components of an ionic liquid alkylation system to one or more components of the $H_2SO_4$ alkylation unit. During an $H_2SO_4$/IL conversion, one or more components of an $H_2SO_4$ alkylation unit may be disconnected, for example, by closing one or more valves, and/or by removing, capping, or replacing one or more lines or interconnections between two or more $H_2SO_4$ alkylation unit components.

In an embodiment, a method for converting a sulfuric acid alkylation unit to an ionic liquid alkylation system may comprise providing an ionic liquid catalyst specific sub-system. The ionic liquid catalyst specific sub-system may also be referred to herein as an ionic liquid specific sub-system. Such an ionic liquid specific sub-system may comprise one or more components configured for connection to one or more components of the $H_2SO_4$ alkylation unit; and the method for $H_2SO_4$/IL conversion may comprise connecting at least one component of the ionic liquid specific sub-system to at least one component of the sulfuric acid alkylation unit. In an embodiment, one or more components of the ionic liquid specific sub-system may be provided de novo for the $H_2SO_4$/IL conversion.

In an embodiment, the ionic liquid specific sub-system may comprise an ionic liquid catalyst alkylation reactor. The ionic liquid catalyst alkylation reactor may be configured for one or more ionic liquid catalyzed hydrocarbon conversion reactions, such as an isoparaffin-olefin alkylation. The ionic liquid catalyst alkylation reactor may also be referred to herein as an ionic liquid alkylation reactor.

In an embodiment, the ionic liquid specific sub-system may further comprise an ionic liquid catalyst/hydrocarbon injection unit, and the method for $H_2SO_4$/IL conversion may further comprise connecting the ionic liquid catalyst/hydrocarbon injection unit to at least one hydrocarbon feed line. The ionic liquid catalyst/hydrocarbon injection unit may also be referred to herein as an ionic liquid/hydrocarbon injection unit.

In an embodiment, the ionic liquid/hydrocarbon injection unit may be integral with the ionic liquid alkylation reactor. In an embodiment, at least a portion, e.g., a distal portion, of the ionic liquid/hydrocarbon injection unit may extend into a void or space within the ionic liquid alkylation reactor. In an embodiment, the ionic liquid/hydrocarbon injection unit may be disposed at least partially within the ionic liquid alkylation reactor. In an embodiment, the ionic liquid/hydrocarbon injection unit may be a part or component of the ionic liquid alkylation reactor.

In an embodiment, at least one hydrocarbon feed line may be provided de novo as a component of the ionic liquid alkylation system. In another embodiment, at least one hydrocarbon feed line of the ionic liquid alkylation system may comprise a component from an $H_2SO_4$ alkylation unit, and the method for $H_2SO_4$/IL conversion may comprise disconnecting the $H_2SO_4$ reactor from the at least one hydrocarbon feed line.

Disconnecting the $H_2SO_4$ reactor from the at least one hydrocarbon feed line or other component(s) may serve to decommission the $H_2SO_4$ reactor. Thereafter, the $H_2SO_4$ reactor may be moved, removed, discarded, or may remain in situ, either temporarily or permanently.

In an embodiment of a method for $H_2SO_4$/IL conversion, the ionic liquid alkylation reactor may be connected to the at least one hydrocarbon feed line via the ionic liquid/hydrocarbon injection unit. In some embodiments, the ionic liquid alkylation reactor may be supplied with or may include the ionic liquid/hydrocarbon injection unit. At least one hydrocarbon feed may be fed to the ionic liquid alkylation reactor via the at least one hydrocarbon feed line and the ionic liquid/hydrocarbon injection unit. The at least one hydrocarbon feed may be treated, e.g., by a feed treatment unit located upstream from the ionic liquid/hydrocarbon injection unit (see, e.g., FIG. 2).

The method for $H_2SO_4$/IL conversion may further comprise connecting the ionic liquid/hydrocarbon injection unit to an ionic liquid catalyst feed line for feeding an ionic liquid catalyst to the ionic liquid alkylation reactor. The ionic liquid catalyst feed line may also be referred to herein as an ionic liquid feed line.

The ionic liquid/hydrocarbon injection unit may be configured for co-injecting the ionic liquid catalyst and at least one hydrocarbon feed into the ionic liquid alkylation reactor. In an embodiment, the ionic liquid/hydrocarbon injection unit may comprise at least one nozzle. The use of one or more nozzles for ionic liquid catalyzed alkylation is disclosed, for example, in commonly assigned U.S. Patent Application Publication Nos. 20090166257, 20090171133, and 20090171134, and in U.S. patent application Ser. No. 12/780,452, filed May 14, 2010, the disclosure of each of which is incorporated by reference herein in its entirety.

In an embodiment, the ionic liquid alkylation reactor and the ionic liquid/hydrocarbon injection unit may be co-configured for forming a mixture comprising an ionic liquid phase and a hydrocarbon phase. Such a mixture may be formed in the ionic liquid alkylation reactor. In an embodiment, said mixture may comprise a dispersed ionic liquid phase and a continuous hydrocarbon phase. As an example, a reaction mixture within the ionic liquid alkylation reactor may comprise an emulsion comprising droplets of ionic liquid catalyst suspended in liquid hydrocarbons. In an embodiment, such droplets may be uniformly suspended in the hydrocarbon phase to provide a homogeneous emulsion. The ionic liquid phase may also be referred to herein as an ionic liquid catalyst phase, it being understood that used ionic liquid catalyst, e.g., downstream from the ionic liquid alkylation reactor, may be at least partially spent or otherwise degraded.

In an embodiment, the ionic liquid alkylation reactor may comprise, or may be used in conjunction with, one or more nozzles for generating the ionic liquid catalyst/hydrocarbon emulsion. In other embodiments, various ionic liquid alkylation reactor configurations may be utilized to provide a uniform or homogeneous mixture of ionic liquid catalyst and hydrocarbon, such as a reactor system containing one or more in-line mixers (e.g., static mixers), or a continuous stirred tank reactor having one or more impellers.

In an embodiment, the ionic liquid specific sub-system may further comprise an ionic liquid catalyst coalescer, and the method for $H_2SO_4$/IL conversion may further comprise connecting the ionic liquid catalyst coalescer to a fractionation unit for feeding the hydrocarbon phase to the fractionation unit. The ionic liquid catalyst coalescer may also be referred to herein as an ionic liquid coalescer.

In an embodiment, the fractionation unit of the ionic liquid alkylation system may comprise at least a portion of a conventional fractionation unit from an $H_2SO_4$ alkylation unit. In an embodiment, the conventional fractionation unit of the $H_2SO_4$ alkylation unit may be modified, e.g., during an $H_2SO_4$/IL conversion, to provide a modified fractionation unit for the ionic liquid alkylation system. In an embodiment, the modified fractionation unit may comprise a portion of the fractionation unit from an $H_2SO_4$ alkylation unit in combination with one or more fractionation unit components provided de novo for the ionic liquid alkylation system. In an embodiment, the one or more fractionation unit components provided de novo for the ionic liquid alkylation system may comprise a nickel alloy. In an embodiment, one or more components (e.g., comprising carbon steel) of a conventional fractionation unit may be upgraded, e.g., by substituting therefor an alloy such as a Ni/Cu alloy or a Ni/Cr alloy.

It is to be understood that such upgrading of metallurgy is not necessarily limited to the fractionation section of a retrofitted or converted alkylation system. In general, the upgrading of carbon steel components of an existing $H_2SO_4$ alkylation unit to the higher metallurgy may be performed for streams containing mostly ionic liquid catalyst, such as the ionic liquid catalyst regeneration section and the ionic liquid catalyst recycle line.

In an embodiment, the method for $H_2SO_4$/IL conversion may comprise modifying or retrofitting at least one distillation column of the conventional fractionation unit from an $H_2SO_4$ alkylation unit to provide a modified fractionation unit for the ionic liquid alkylation system. In another embodiment, modifying the conventional fractionation unit may comprise adding one or more distillation columns to the conventional fractionation unit. The modified fractionation unit may be configured for separating an HCl-rich $C_{3-}$ fraction from the hydrocarbon phase or from a portion of the hydrocarbon phase.

The fractionation unit may be modified before or after connecting the fractionation unit to the ionic liquid/hydrocarbon separation unit. The ionic liquid alkylation system may be configured for recycling the HCl-rich $C_{3-}$ fraction to the ionic liquid alkylation reactor. Recycling of an HCl- and propane-rich fraction to an ionic liquid alkylation reactor is disclosed in commonly assigned U.S. Patent Application Publication No. 20110155640, the disclosure of which is incorporated by reference herein in its entirety.

In an embodiment, the ionic liquid alkylation system may further comprise a primary separator vessel. In an embodiment, the primary separator vessel may be provided de novo for the ionic liquid alkylation system, such that at least one vessel from the existing $H_2SO_4$ alkylation unit, such as the acid settler, the acid wash vessel, or the alkaline water wash vessel, may be surplus to requirements for ionic liquid catalyzed alkylation. In which case, a method for $H_2SO_4$/IL conversion may comprise disconnecting and/or decommissioning one or more such components during the $H_2SO_4$/IL conversion. Such decommissioning and/or disconnecting of the $H_2SO_4$ alkylation unit components may be temporary or permanent. As a non-limiting example, decommissioned components from the $H_2SO_4$ alkylation unit may be moved, removed, discarded, or may remain in situ, either temporarily or permanently.

A method for $H_2SO_4$/IL conversion of an $H_2SO_4$ alkylation unit may further comprise connecting the ionic liquid alkylation reactor to the primary separator vessel for feeding an alkylation reactor effluent from the ionic liquid alkylation reactor to the primary separator vessel. The primary separator vessel may be configured for separating the alkylation reactor effluent into a hydrocarbon phase and an ionic liquid phase. In an embodiment, the method for $H_2SO_4$/IL conversion may further comprise connecting the primary separator vessel to the ionic liquid coalescer for feeding the hydrocarbon phase from the primary separator vessel to the ionic liquid coalescer.

In an alternative embodiment, one or more components from an existing or prior $H_2SO_4$ alkylation unit, such as the acid settler, the acid wash vessel, or the alkaline water wash vessel, may be retained and/or adapted as component(s) of the ionic liquid alkylation system. As an example, one or more of the acid settler, the acid wash vessel, and the alkaline water wash vessel, may be configured for separating alkylation reactor effluent into the hydrocarbon phase and the ionic liquid phase. Accordingly, in an embodiment the ionic liquid/hydrocarbon separation unit may comprise one or more of the acid settler, the acid wash vessel, and the alkaline water wash vessel.

According to another embodiment of the present invention, a method for converting an $H_2SO_4$ alkylation unit to an ionic liquid alkylation system may comprise providing an ionic liquid alkylation reactor and a heat exchanger. The $H_2SO_4$/IL conversion process may involve thermally coupling the heat exchanger to the ionic liquid alkylation reactor for cooling the ionic liquid alkylation reactor. In an embodiment, the heat exchanger may be supplied with, or may be integral to, the ionic liquid alkylation reactor.

In embodiments where the $H_2SO_4$ alkylation unit undergoing conversion includes an effluent refrigeration unit (see, e.g., FIG. 1B), the $H_2SO_4$/IL conversion may comprise connecting the heat exchanger to the existing effluent refrigeration unit from the $H_2SO_4$ alkylation unit. In other embodiments, for example, where the $H_2SO_4$ alkylation unit undergoing conversion includes an external (non-effluent) refrigeration unit (e.g., FIG. 1A), the $H_2SO_4$/IL conversion may comprise decommissioning the external refrigeration unit, providing an effluent refrigeration unit in lieu of the decommissioned external refrigeration unit, and connecting the effluent refrigeration unit to the heat exchanger.

The ionic liquid coalescer may be in fluid communication with the ionic liquid alkylation reactor, e.g., via a primary separator vessel coupled to an outlet port of the ionic liquid alkylation reactor. The ionic liquid coalescer and the primary separator vessel may jointly form an ionic liquid/hydrocarbon separation unit. A method for $H_2SO_4$/IL conversion may comprise connecting the primary separator vessel to the ionic liquid alkylation reactor, such that the primary separator vessel may be in fluid communication with the ionic liquid alkylation reactor for feeding an alkylation reactor effluent from the ionic liquid reactor to the primary separator vessel. The primary separator vessel may be configured for separating the alkylation reactor effluent into a hydrocarbon phase and an ionic liquid phase.

The ionic liquid coalescer may receive at least a portion of the hydrocarbon phase from the primary separator vessel. In an embodiment, the hydrocarbon phase from the primary separator vessel may be incompletely separated from the ionic liquid; for example, the hydrocarbon phase from the primary separator vessel may comprise entrained ionic liquid. The ionic liquid coalescer may be configured for separating the entrained ionic liquid from the hydrocarbon phase, and the ionic liquid alkylation system may be configured for recycling the entrained ionic liquid from the ionic liquid coalescer to the ionic liquid alkylation reactor.

In an embodiment, a method for $H_2SO_4$/IL conversion may further comprise connecting the ionic liquid coalescer to the fractionation unit. In an embodiment, the fractionation unit may be retained from the existing $H_2SO_4$ alkylation unit undergoing conversion, or may be derived or adapted from one or more components of the fractionation unit of said $H_2SO_4$ alkylation unit.

An $H_2SO_4$ alkylation unit destined for conversion to an ionic liquid alkylation system may include at least one component comprising a material, e.g., carbon steel, which is incompatible with one or more zones of ionic liquid catalyzed alkylation processes. In an embodiment, a method for $H_2SO_4$/IL conversion may comprise replacing one or more component(s) of the $H_2SO_4$ alkylation unit with one or more component(s) comprising a suitable material, e.g., a nickel alloy. In a sub-embodiment, the Ni alloy may comprise a Ni/Cr alloy comprising predominantly Ni (>50 wt % Ni) in combination with up to about 26 wt % Cr. In another sub-embodiment, the Ni alloy may comprise a Ni/Cu alloy comprising predominantly Ni (>50 wt % Ni) in combination with up to about 32 wt % Cu. Non-limiting examples of a Ni/Cr alloy and a Ni/Cu alloy are Alloy C-276 and Alloy 400, respectively.

In an embodiment, a method for converting a conventional alkylation unit to an ionic liquid alkylation system may comprise providing an ionic liquid alkylation reactor configured for ionic liquid catalyzed alkylation reactions, and connecting the ionic liquid alkylation reactor to at least one component of the conventional alkylation unit. The ionic liquid alkylation reactor may have an ionic liquid/hydrocarbon injection unit in fluid communication therewith. In an embodiment, the ionic liquid/hydrocarbon injection unit may be integral with, disposed within, and/or a component of the ionic liquid alkylation reactor.

In another embodiment, a method for converting a conventional alkylation unit to an ionic liquid alkylation system may comprise configuring the ionic liquid/hydrocarbon injection unit for co-injecting the ionic liquid catalyst and at least one hydrocarbon feed into the ionic liquid alkylation reactor. In an embodiment, the ionic liquid alkylation reactor and the ionic liquid/hydrocarbon injection unit may be co-configured for forming, in the ionic liquid alkylation reactor, a homogeneous mixture comprising a dispersed ionic liquid phase and a continuous hydrocarbon phase.

The ionic liquid/hydrocarbon injection unit may be connected to at least one hydrocarbon feed line for feeding at least one hydrocarbon feed to the ionic liquid alkylation reactor. In an embodiment, the at least one hydrocarbon feed may be treated via a feed treatment unit disposed upstream from the ionic liquid/hydrocarbon injection unit.

In an embodiment, the at least one hydrocarbon feed may comprise an isoparaffin containing feed and an olefin containing feed. The feed treatment unit may comprise at least one feed dryer unit for drying the hydrocarbon feed(s). The feed treatment unit may further comprise a hydroisomerization unit for treating an olefin containing feed, e.g., for removing butadiene and for isomerizing 1-butene to 2-butene.

In an embodiment, the feed treatment unit may comprise a component of an existing or prior $H_2SO_4$ alkylation unit. In another embodiment, an existing $H_2SO_4$ alkylation unit for conversion to an ionic liquid alkylation system may lack a suitable feed treatment unit, and the feed treatment unit for the ionic liquid alkylation system may comprise one or more components provided de novo for the $H_2SO_4$/IL conversion.

During an $H_2SO_4$/IL conversion the ionic liquid/hydrocarbon separation unit may be connected to the ionic liquid alkylation reactor. The ionic liquid/hydrocarbon separation unit may be configured for separating an alkylation reactor effluent of the ionic liquid alkylation reactor into the ionic liquid phase and the hydrocarbon phase. The ionic liquid phase may comprise ionic liquid catalyst, while the hydrocarbon phase may comprise an alkylate. The hydrocarbon phase may further comprise unconverted light hydrocarbons.

The ionic liquid/hydrocarbon separation unit may comprise a primary separator vessel and an ionic liquid coalescer in fluid communication with the primary separator vessel. In an embodiment, the ionic liquid/hydrocarbon separation unit may be connected to the ionic liquid alkylation reactor via the primary separator vessel.

In an embodiment, an $H_2SO_4$/IL conversion may further comprise connecting the ionic liquid/hydrocarbon separation unit to the fractionation unit for feeding at least a portion of the hydrocarbon phase to the fractionation unit. In an embodiment, the ionic liquid/hydrocarbon separation unit may be connected to the fractionation unit via the ionic liquid coalescer. In another embodiment, at least a portion of the hydrocarbon phase may be circulated to a refrigeration unit via a heat exchanger in thermal communication with the ionic liquid alkylation reactor. The refrigeration unit may be connected via one or more lines to the fractionation unit of the ionic liquid alkylation system for feeding one or more hydrocarbon streams from the refrigeration unit to the fractionation unit (see, e.g., FIG. 5).

The method for $H_2SO_4$/IL conversion may further comprise providing an ionic liquid catalyst regeneration unit for regenerating the ionic liquid catalyst, and connecting the ionic liquid catalyst regeneration unit to the ionic liquid/hydrocarbon separation unit for feeding a portion of the ionic liquid phase from the ionic liquid/hydrocarbon separation unit to the ionic liquid catalyst regeneration unit. The ionic liquid phase from the ionic liquid/hydrocarbon separation unit may comprise at least partially spent ionic liquid catalyst, and the ionic liquid/hydrocarbon regeneration unit may be configured for regenerating such ionic liquid catalyst to provide regenerated ionic liquid catalyst.

The method for $H_2SO_4$/IL conversion may further comprise connecting the ionic liquid catalyst regeneration unit to the ionic liquid alkylation reactor for feeding at least a portion of the regenerated ionic liquid catalyst to the ionic liquid alkylation reactor. The regeneration of ionic liquid catalysts is disclosed, for example, in commonly assigned U.S. Pat. Nos. 7,674,739 and 7,691,771, the disclosure of each of which is incorporated by reference herein in its entirety.

After an $H_2SO_4$/IL conversion has been completed, the resulting ionic liquid alkylation system may begin operation following a suitable startup procedure. Methods for starting and operating ionic liquid catalyzed hydrocarbon conversion processes and systems are disclosed in commonly assigned, co-pending U.S. patent application Ser. No. 12/825,121, filed Jun. 28, 2010, the disclosure of which is incorporated by reference herein in its entirety.

Ionic Liquid Catalyzed Alkylation Processes

Figure 2:
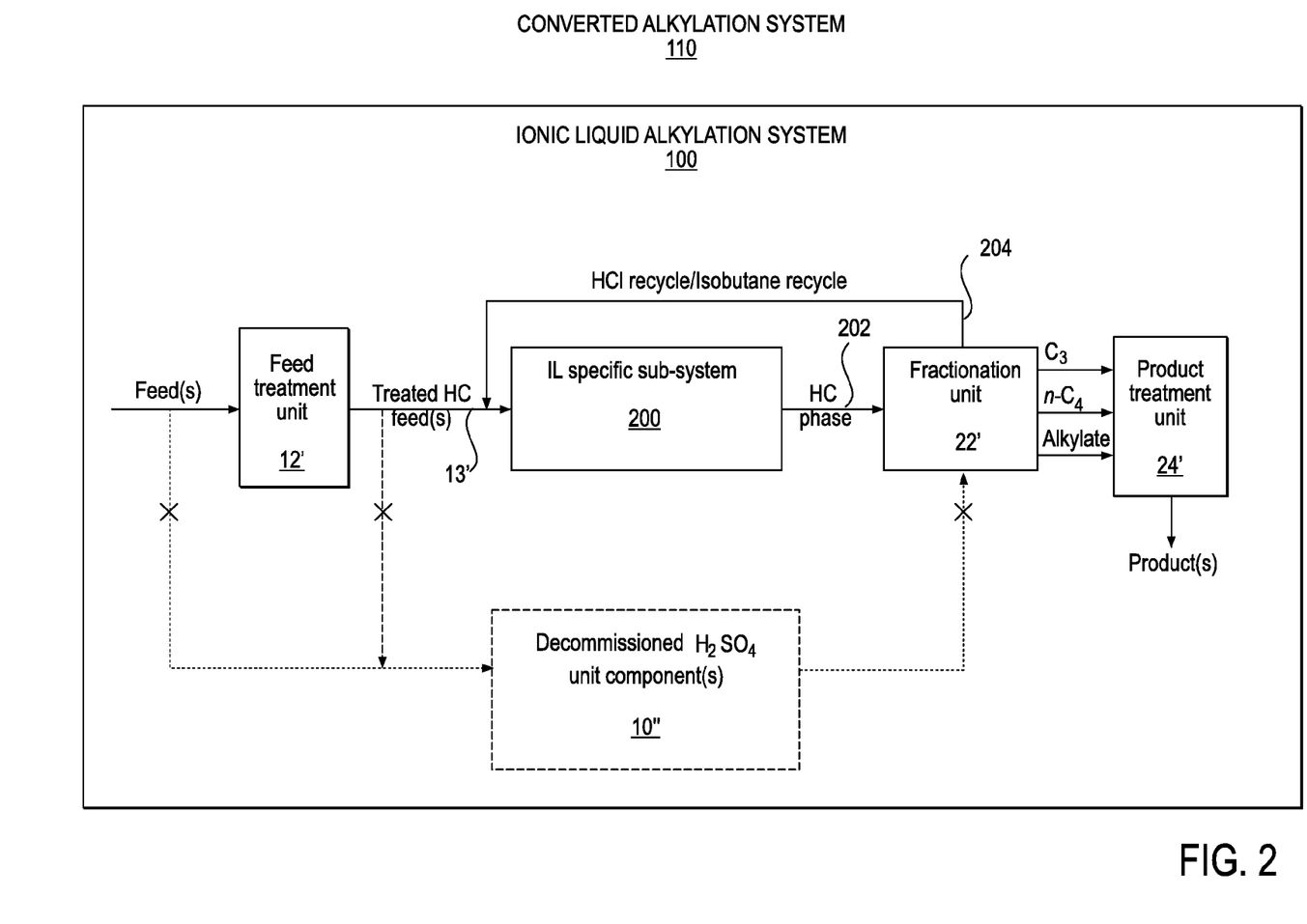
FIG. 2 schematically represents a converted ionic liquid catalyzed alkylation system, according to an embodiment of the present invention.
Figure 3:
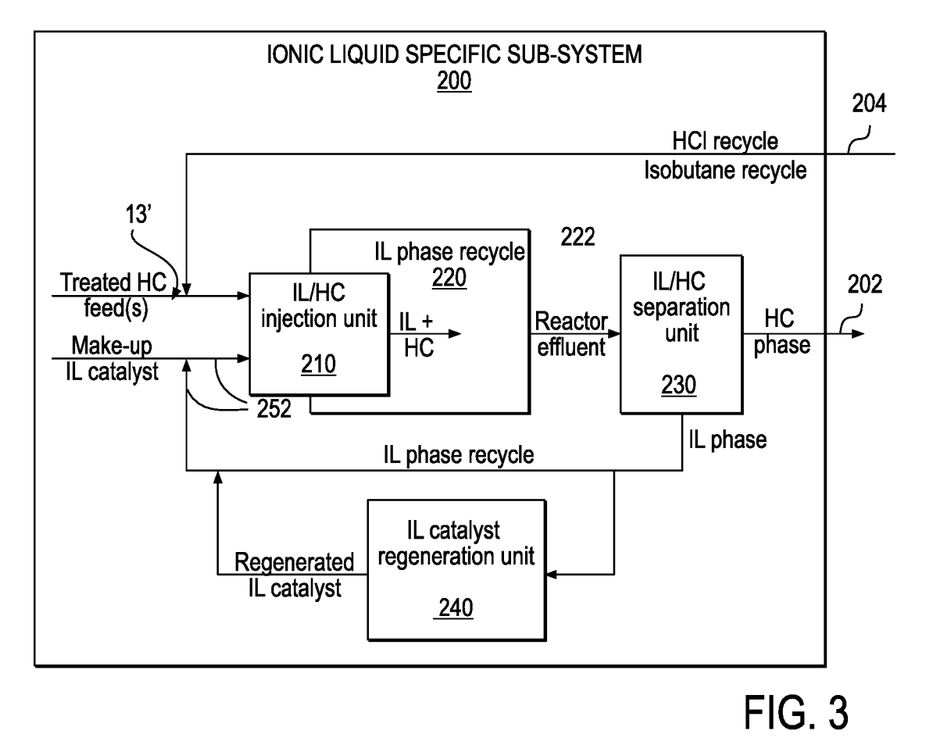
FIG. 3 schematically represents a sub-system for an ionic liquid alkylation system, according to another embodiment of the present invention.
Figure 4:
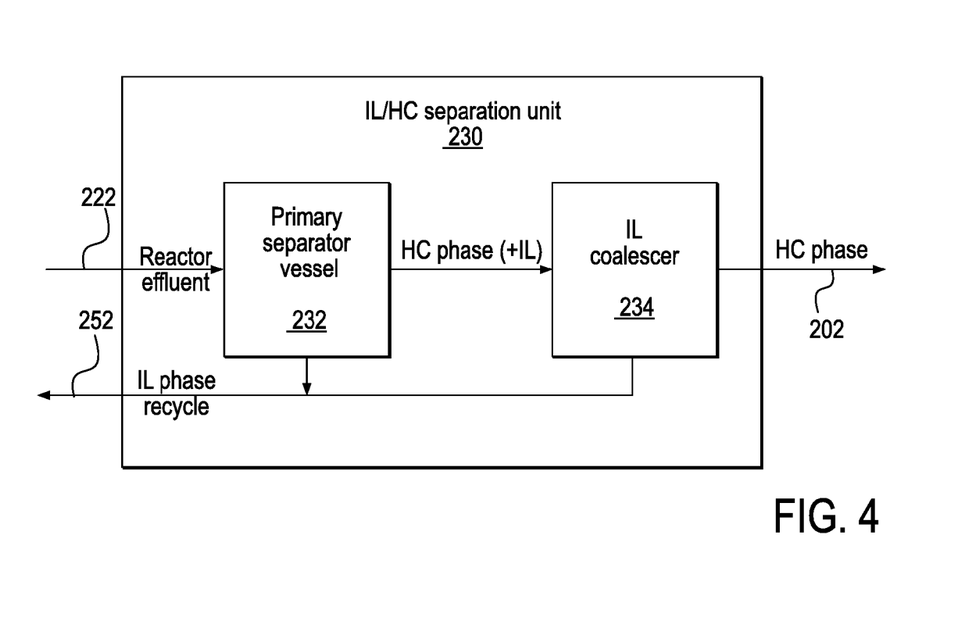
FIG. 4 schematically represents an ionic liquid catalyst/hydrocarbon separation unit for an ionic liquid catalyzed alkylation system, according to another embodiment of the present invention.

With reference to FIGS. 2-4, during an ionic liquid catalyzed alkylation process conducted using system 100, treated hydrocarbon feed(s) may be introduced into ionic liquid alkylation reactor 220. Ionic liquid alkylation reactor 220 may also be referred to herein as an ionic liquid alkylation zone. The hydrocarbon feed(s) may be treated using feed treatment unit 12'. The hydrocarbon feed(s) may include at least one hydrocarbon reactant. In a sub-embodiment, the at least one hydrocarbon reactant may comprise a first reactant comprising a $C_4$-$C_{10}$ isoparaffin and a second reactant comprising a $C_2$-$C_{10}$ olefin. Treatment of the hydrocarbon feed(s) may include feed drying, as well as the removal of dienes and the hydroisomerization of olefins in olefin feeds. The selective hydrogenation and hydroisomerization of feedstock for ionic liquid catalyzed alkylation is disclosed in commonly assigned U.S. Patent Application Publication No. 20110092753, the disclosure of which is incorporated by reference herein in its entirety.

Ionic liquid catalyst and the at least one hydrocarbon feed may be introduced into ionic liquid alkylation reactor 220 via ionic liquid/hydrocarbon injection unit 210. In an embodiment, the ionic liquid catalyst may comprise a chloroaluminate ionic liquid, as described hereinbelow. A co-catalyst such as anhydrous HCl and/or a catalyst promoter may also be fed to ionic liquid alkylation reactor 220. Ionic liquid/hydrocarbon injection unit 210 may also be referred to herein as an ionic liquid catalyst/hydrocarbon injection unit 210.

One skilled in the art will recognize that FIGS. 2-5 are schematic representations indicating fluid communication between units or components. FIGS. 2-5 are not intended to show the relative size or shape of the various components or units. In an embodiment ionic liquid/hydrocarbon injection unit 210 may be integral with ionic liquid alkylation reactor 220. In an embodiment, at least a portion, e.g., a distal portion, of ionic liquid/hydrocarbon injection unit 210 may extend into a void or space within ionic liquid alkylation reactor 220. In an embodiment, ionic liquid/hydrocarbon injection unit 210 may be disposed at least partially within ionic liquid alkylation reactor 220. In an embodiment, ionic liquid/hydrocarbon injection unit 210 may be a part or component of ionic liquid alkylation reactor 220.

During alkylation processes according to embodiments of the invention, ionic liquid alkylation reactor 220 may contain a biphasic mixture comprising an ionic liquid phase and a hydrocarbon phase. The hydrocarbon phase may comprise at least one hydrocarbon product (e.g., alkylate) of the ionic liquid catalyzed reaction. The ionic liquid phase may be separated from the hydrocarbon phase via ionic liquid/hydrocarbon separation unit 230. The ionic liquid phase may comprise ionic liquid catalyst. Ionic liquid/hydrocarbon separation unit 230 may also be referred to herein as an ionic liquid catalyst/hydrocarbon separation unit 230. Ionic liquid/hydrocarbon separation unit 230 may comprise a primary separator vessel 232 and an ionic liquid coalescer 234. Ionic liquid coalescer 234 may also be referred to herein as an ionic liquid catalyst coalescer 234.

In an embodiment, at least a portion of the ionic liquid phase from ionic liquid/hydrocarbon separation unit 230 may be recycled to ionic liquid alkylation reactor 220. With continued operation of system 100, the ionic liquid catalyst may become at least partially deactivated. In order to maintain catalytic activity of the ionic liquid catalyst, a portion of the ionic liquid catalyst phase may be fed to ionic liquid catalyst regeneration unit 240 for regeneration of the ionic liquid catalyst. Thereafter, at least a portion of the regenerated ionic liquid catalyst may be recycled to ionic liquid alkylation reactor 220, e.g., via an ionic liquid feed line 252 and ionic liquid/hydrocarbon injection unit 210.

In an embodiment, at least a portion of the hydrocarbon phase from ionic liquid coalescer 234 may be fed, e.g., via line 202, to fractionation unit 22' for fractionation of the hydrocarbon phase to provide one or more hydrocarbon products. The one or more hydrocarbon products may be fed to product treatment unit 24' for treating the hydrocarbon product(s). In an embodiment, fractionation unit 22', which may include multiple distillation or fractionation columns, may comprise a modified fractionation unit obtained by modifying fractionation unit 22 of conventional alkylation units 10 or 10'(FIGS. 1A and 1B). Fractionation unit 22' may comprise at least one converted, modified or retrofitted distillation column that is configured for the separation of an HCl-rich $C_{3-}$ fraction. At least a portion of the HCl-rich $C_{3-}$ fraction may be recycled to ionic liquid alkylation reactor 220, e.g., via line 204. At least one fraction comprising isobutane may also be recycled to ionic liquid alkylation reactor 220. For the sake of clarity, only a single line is shown for recycling HCl- and isobutane containing fractions to ionic liquid alkylation reactor 220.

In an embodiment, ionic liquid alkylation system 100 may be used in conjunction with a heat exchanger and a refrigeration unit (not shown in FIG. 2). The refrigeration unit may comprise, for example, an external (conventional) refrigeration unit or an effluent refrigeration unit.

Figure 5:
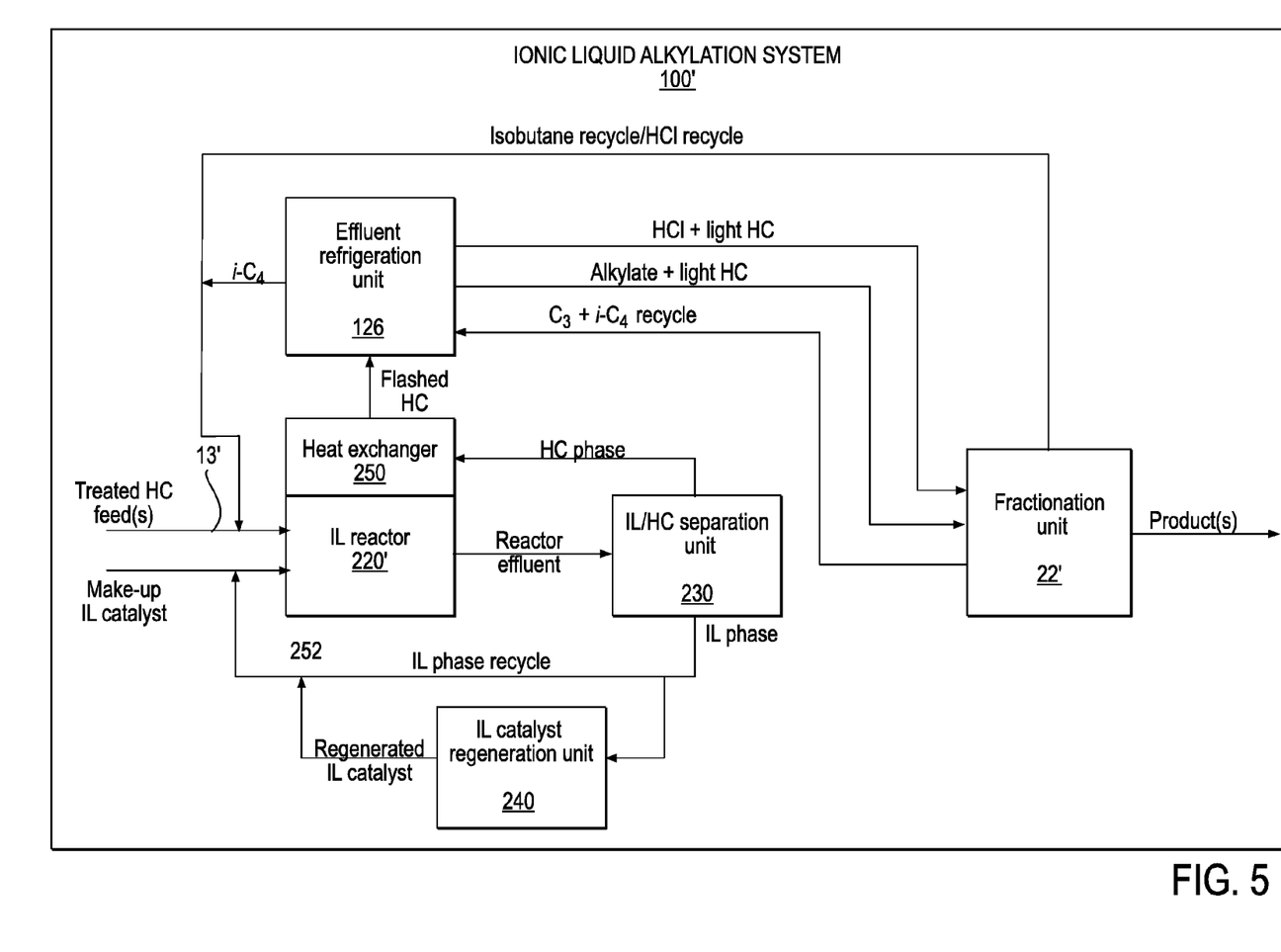
FIG. 5 schematically represents an ionic liquid alkylation system, according to another embodiment of the present invention.

With reference to FIG. 5, in an ionic liquid alkylation process at least one isoparaffin and at least one olefin may be contacted with an ionic liquid catalyst in ionic liquid alkylation reactor 220' under ionic liquid catalyzed alkylation conditions. The hydrocarbon feed(s) to ionic liquid alkylation reactor 220' may be substantially as described, e.g., with reference to FIGS. 2-4. Typical conditions for ionic liquid catalyzed alkylation reactions are described hereinbelow.

During ionic liquid alkylation processes conducted using system 100', ionic liquid alkylation reactor 220' may be in thermal communication with a heat exchanger 250. Ionic liquid alkylation reactor 220' and heat exchanger 250 may be co-configured for removing heat from ionic liquid alkylation reactor 220'. Heat exchanger 250 may be in fluid communication with effluent hydrocarbons from ionic liquid alkylation reactor 220'. For example, at least a portion of the hydrocarbon phase from ionic liquid/hydrocarbon separation unit 230 may be flashed, e.g., via an expansion valve (not shown), for providing cooled effluent hydrocarbons to heat exchanger 250. After the hydrocarbon phase or a portion thereof has been flashed, the HC phase may be referred to as the flashed hydrocarbon phase. The flashed hydrocarbon phase may be passed through heat exchanger 250, such that heat may be removed from ionic liquid alkylation reactor 220', and thence to effluent refrigeration unit 126.

Effluent refrigeration unit 126 may comprise a compressor and a condenser as well as one or more vapor-liquid separators (not shown), as is known in the art. In an embodiment, effluent refrigeration unit 126 may have hydrocarbon fractionation capability sufficient to fractionate or separate the hydrocarbon phase into a plurality of hydrocarbon streams. Such hydrocarbon streams may include, for example, a first hydrocarbon stream comprising predominantly isobutane for recycling to ionic liquid alkylation reactor 220', a second hydrocarbon stream comprising a mixture of alkylate and light hydrocarbons, and a third hydrocarbon stream comprising a mixture of light hydrocarbons and HCl.

In an embodiment, the second hydrocarbon stream may be fed to a first distillation column (not shown) of fractionation unit 22' to provide n-butane, an alkylate product, and isobutane, wherein the latter may be recycled to ionic liquid alkylation reactor 220'. The third hydrocarbon stream may be fed to a second distillation column (also not shown) of fractionation unit 22' to provide a propane product, an HCl-rich $C_{3-}$ fraction, and a fraction comprising isobutane and propane. The fraction comprising isobutane and propane may be recycled to effluent refrigeration unit 126. The HCl-rich $C_{3-}$ fraction may be recycled to ionic liquid alkylation reactor 220'. Ionic liquid alkylation reactor 220' may also be referred to herein as an ionic liquid alkylation zone.

Ionic Liquid Catalysts

Ionic liquids are generally organic salts with melting points below 100° C. (212° F.) and often below room temperature. They may find applications in various chemical reactions, solvent processes, and electrochemistry. The use of chloroaluminate ionic liquids as alkylation catalysts in petroleum refining has been described, for example, in commonly assigned U.S. Pat. Nos. 7,531,707, 7,569,740, and 7,732,654, the disclosure of each of which is incorporated by reference herein in its entirety.

Most ionic liquids are prepared from organic cations and inorganic or organic anions. Cations include, but are not limited to, ammonium, phosphonium and sulphonium. Anions include, but are not limited to, $BF_4^-$, $PF_6^-$, haloaluminates such as $Al_2Cl_7^-$ and $Al_2Br_7^-$, $[(CF_3SO_2)_2N]^-$, alkyl sulfates ($RSO_3^-$), and carboxylates ($RCO_2^-$). Ionic liquids for acid catalysis may include those derived from ammonium halides and Lewis acids, such as $AlCl_3$, $TiCl_4$, $SnCl_4$, and $FeCl_3$. Chloroaluminate ionic liquids are perhaps the most commonly used ionic liquid catalyst systems for acid catalyzed reactions.

Exemplary ionic liquids for use as catalysts in ionic liquid catalyzed alkylation reactions may comprise at least one compound of the general formulas A and B:

wherein R is selected from the group consisting of H, methyl, ethyl, propyl, butyl, pentyl or hexyl, each of $R_1$ and $R_2$ is selected from the group consisting of H, methyl, ethyl, propyl, butyl, pentyl or hexyl, wherein $R_1$ and $R_2$ may or may not be the same, and X is a chloroaluminate.

Non-limiting examples of chloroaluminate ionic liquid catalysts that may be used in alkylation processes according to embodiments of the instant invention include those comprising 1-butyl-4-methyl-pyridinium chloroaluminate, 1-butyl-3-methyl-imidazolium chloroaluminate, 1-H-pyridinium chloroaluminate, N-butylpyridinium chloroaluminate, and mixtures thereof.

Reaction Conditions for Ionic Liquid Catalyzed Hydrocarbon Conversion Reactions

Due to the low solubility of hydrocarbons in ionic liquids, hydrocarbon conversion reactions in ionic liquids (including isoparaffin-olefin alkylation reactions) are generally biphasic and occur at the interface in the liquid state. The volume of ionic liquid catalyst in the reactor may be generally in the range from about 1 to 70 vol %, and usually from about 4 to 50 vol %. In an embodiment, an ionic liquid/hydrocarbon injection unit may be used to co-inject reactant(s) and ionic liquid catalyst into the ionic liquid alkylation reactor to ensure good contact between the ionic liquid catalyst and reactants.

The reaction temperature for ionic liquid catalyzed alkylation may be generally in the range from about −40 to +250° C. (−40 to +482° F.), typically from about −20 to +100° C. (−4 to +212° F.), and often from about +4 to +60° C. (+40 to +140° F.). The ionic liquid catalyzed alkylation reactor pressure may be in the range from atmospheric pressure to about 8000 kPa. Typically, the reactor pressure is sufficient to keep the reactants in the liquid phase.

Residence time of reactants in the ionic liquid alkylation reactor may generally be in the range from a few seconds to hours, and usually from about 0.5 min to 60 min. In the case of ionic liquid catalyzed isoparaffin-olefin alkylation, the reactants may be introduced in an isoparaffin:olefin molar ratio generally in the range from about 1-100, more typically from about 2-50, and often from about 2-20. Reactor conditions may be adjusted to optimize process performance for a particular ionic liquid catalyzed alkylation process. Conditions described herein for ionic liquid catalyzed alkylation may be referred to collectively as ionic liquid catalyzed alkylation conditions.

Ionic Liquid Alkylation Systems Derived from Conventional Alkylation Units

In an embodiment, the present invention provides ionic liquid catalyzed alkylation systems configured for performing ionic liquid alkylation processes, wherein said systems may be derived from existing or prior $H_2SO_4$ alkylation units. As an example, one or more components of an ionic liquid alkylation system may be provided de novo, while other components of the ionic liquid alkylation system may be derived or adapted from components of an existing or prior $H_2SO_4$ alkylation unit.

FIG. 2 schematically represents a converted ionic liquid catalyzed alkylation system, according to an embodiment of the present invention. Converted ionic liquid catalyzed alkylation system 110 may comprise an ionic liquid alkylation system 100. In an embodiment, converted ionic liquid catalyzed alkylation system 110 may further comprise one or more decommissioned $H_2SO_4$ unit components 10". By "decommissioned $H_2SO_4$ unit components" is meant one or more components of $H_2SO_4$ alkylation unit 10 or 10' that are taken out of service, either temporarily or permanently. Ionic liquid alkylation system 100 may also be referred to herein as ionic liquid catalyst alkylation system 100.

The one or more decommissioned $H_2SO_4$ unit components 10" may be disconnected from one or more retained components of $H_2SO_4$ alkylation unit 10, or 10'. By "retained components" of $H_2SO_4$ alkylation unit 10 or 10' is meant one or more components from $H_2SO_4$ alkylation unit 10 or 10' that are to be retained, either as is or in modified form, for performing ionic liquid catalyzed alkylation processes.

In an embodiment, one or more decommissioned $H_2SO_4$ unit components 10" may remain in situ, e.g., adjacent to one or more ionic liquid specific components of ionic liquid alkylation system 100. In another embodiment, one or more decommissioned $H_2SO_4$ unit components 10" may be removed and/or discarded. As an example, decommissioned $H_2SO_4$ unit component(s) 10" may comprise $H_2SO_4$ reactor 14 (FIGS. 1A and 1B). As another example, decommissioned $H_2SO_4$ unit component(s) 10" may comprise acid settler 16. As a further example, decommissioned $H_2SO_4$ unit component(s) 10" may comprise external refrigeration unit 26.

With reference to FIGS. 2 and 3, ionic liquid alkylation system 100 may comprise a feed treatment unit 12', at least one hydrocarbon feed line 13', an ionic liquid specific subsystem 200, a fractionation unit 22', and a product treatment unit 24'. Ionic liquid alkylation system 100 may be used for efficiently conducting ionic liquid catalyzed alkylation processes. Feed treatment unit 12' may be configured for treating at least one hydrocarbon feed for ionic liquid catalyzed alkylation reactions. Fractionation unit 22' may be configured for fractionating the hydrocarbon phase from ionic liquid alkylation reactor 220 to provide one or more hydrocarbon products. One or more of the hydrocarbon products may be fed to product treatment unit 24' for removing any contaminants from the hydrocarbon product(s).

In an embodiment, at least one component of an existing $H_2SO_4$ alkylation unit may be retained, at least temporarily, for use in ionic liquid alkylation system 100. Such retained component(s) may include, for example, one or more of feed treatment unit 12', hydrocarbon feed line 13', fractionation unit 22', and product treatment unit 24'. In another embodiment, one or more components selected from feed treatment unit, 12', hydrocarbon feed line 13', fractionation unit 22', and product treatment unit 24' may be provided de novo, e.g., specifically for assembling ionic liquid alkylation system 100.

In another embodiment, one or more components of ionic liquid alkylation system 100 selected from feed treatment unit 12', hydrocarbon feed line 13', fractionation unit 22', and product treatment unit 24' may comprise an adapted, retrofitted or modified unit or component from a prior $H_2SO_4$ alkylation unit. As a non-limiting example, a conventional fractionation unit 22 may be modified to provide a modified fractionation unit 22' configured for separating an HCl-rich $C_{3-}$ fraction from the hydrocarbon phase. Ionic liquid alkylation system 100 may be configured or adapted, e.g., during an $H_2SO_4$/IL conversion, for recycling the HCl-rich $C_{3-}$ fraction to ionic liquid alkylation reactor 220.

FIG. 3 schematically represents an ionic liquid specific sub-system for an ionic liquid alkylation system, according to an embodiment of the present invention. Ionic liquid specific sub-system 200 may comprise an ionic liquid/hydrocarbon injection unit 210, an ionic liquid alkylation reactor 220, an ionic liquid/hydrocarbon separation unit 230, and an ionic liquid catalyst regeneration unit 240.

At least one treated hydrocarbon feed may be fed to ionic liquid alkylation reactor 220 via hydrocarbon feed line 13' and ionic liquid/hydrocarbon injection unit 210. At the same time, ionic liquid catalyst may be fed to ionic liquid alkylation reactor 220 via ionic liquid feed line 252 and ionic liquid/hydrocarbon injection unit 210. Ionic liquid/hydrocarbon injection unit 210 may be connected to, and in fluid communication with, ionic liquid alkylation reactor 220, for injecting an ionic liquid/hydrocarbon mixture into ionic liquid alkylation reactor 220. In an embodiment, ionic liquid/hydrocarbon injection unit 210 may be integral with, disposed within, or a component of ionic liquid alkylation reactor 220.

Ionic liquid/hydrocarbon injection unit 210 may include at least one nozzle (not shown). Nozzles for introducing ionic liquid catalyst and hydrocarbon feeds into an ionic liquid alkylation reactor are disclosed in commonly assigned U.S. Patent Application Publication Nos. 20090166257, 20090171133, and 20090171134, and in U.S. patent application Ser. No. 12/780,452, filed May 14, 2010, the disclosure of each of which is incorporated by reference herein in its entirety.

Ionic liquid alkylation reactor 220 may be configured for ionic liquid catalyzed alkylation reactions. A mixture in ionic liquid alkylation reactor 220 may comprise an ionic liquid phase and a hydrocarbon phase. The mixture in ionic liquid alkylation reactor 220 may comprise a reaction emulsion comprising a homogeneously dispersed ionic liquid phase in a continuous hydrocarbon phase.

FIG. 4 schematically represents an ionic liquid/hydrocarbon separation unit for an ionic liquid catalyzed alkylation system, according to an embodiment of the present invention. Ionic liquid/hydrocarbon separation unit 230 may include a primary separator vessel 232 and an ionic liquid coalescer 234.

With further reference to FIGS. 3 and 4, ionic liquid/hydrocarbon separation unit 230 may be connected to ionic liquid alkylation reactor 220 via primary separator vessel 232. Primary separator vessel 232 may be configured for receiving alkylation reactor effluent from ionic liquid alkylation reactor 220 via line 222, and for separating the alkylation reactor effluent into a hydrocarbon phase and an ionic liquid phase. In an embodiment, primary separator vessel 232 may comprise one or more of acid settler 16, acid wash vessel 18, and alkaline water wash vessel 20 from $H_2SO_4$ alkylation unit 10 or 10' undergoing or having undergone an $H_2SO_4$/IL conversion.

At least a first portion of the ionic liquid phase from primary separator vessel 232 may be recycled to ionic liquid alkylation reactor 220. A second portion of the ionic liquid phase from ionic liquid/hydrocarbon separation unit 230 may be fed to ionic liquid catalyst regeneration unit 240 for ionic liquid catalyst regeneration, and regenerated ionic liquid catalyst may be recycled to ionic liquid alkylation reactor 220 via line 252.

Ionic liquid coalescer 234 may be connected to, and in fluid communication with, primary separator vessel 232 for receiving at least a portion of the hydrocarbon phase from primary separator vessel 232. Ionic liquid coalescer 234 may be configured for separating any entrained ionic liquid from the hydrocarbon phase. The entrained ionic liquid may be recycled from the ionic liquid coalescer 234 to ionic liquid alkylation reactor 220.

In an embodiment, ionic liquid coalescer 234 may comprise multiple stages or modules of coalescer material, and the stages may be arranged in series and/or in parallel. The coalescer material may be selected to have a higher affinity for the ionic liquid phase as compared with the hydrocarbon phase, and the coalescer material may be fully wettable by the ionic liquid phase. The separation of an ionic liquid/hydrocarbon emulsion using a coalescer is disclosed in commonly assigned U.S. Patent Application Publication No. 20100130800, the disclosure of which is incorporated by reference herein in its entirety.

FIG. 5 schematically represents an ionic liquid alkylation system, according to another embodiment of the present invention. Ionic liquid alkylation system 100' may comprise at least one hydrocarbon feed line 13', a fractionation unit 22', an ionic liquid alkylation reactor 220', an ionic liquid/hydrocarbon separation unit 230, an ionic liquid catalyst regeneration unit 240, a heat exchanger 250, and an effluent refrigeration unit 126. Ionic liquid alkylation system 100' may further comprise a feed treatment unit 12' and a product treatment unit 24' (see, e.g., FIG. 2), neither of which are shown in FIG. 5.

Ionic liquid alkylation reactor 220' may be configured for ionic liquid catalyzed alkylation reactions. In an embodiment, ionic liquid alkylation reactor 220' may be provided and used in conjunction with an ionic liquid/hydrocarbon injection unit (see, e.g., FIG. 3). Ionic liquid alkylation reactor 220' is not limited to any particular reactor configuration. In various embodiments, reactor 220' may comprise, for example, a continuous stirred tank reactor having one or more impellers, a loop-nozzle reactor, or a reactor system incorporating one or more static mixers, and the like.

Ionic liquid alkylation system 100' may be derived from an existing alkylation unit, e.g., conventional alkylation units 10 or 10' of FIGS. 1A-B. Some components of ionic liquid alkylation system 100' may be retained from the conventional alkylation unit 10 or 10', either as is or in modified form, while other components of ionic liquid alkylation system 100' may be provided de novo for conversion of the existing conventional unit 10 or 10' to ionic liquid alkylation system 100', substantially as described hereinabove with reference to FIGS. 2-4. As a non-limiting example, ionic liquid alkylation reactor 220' may be provided as a de novo component of ionic liquid alkylation system 100'.

As another example, fractionation unit 22' of ionic liquid alkylation system 100' may comprise a modified fractionation unit obtained by modification of conventional fractionation unit 22 (see, e.g., FIGS. 1A and 1B). In an embodiment, conventional fractionation unit 22 may be modified such that modified fractionation unit 22' is configured for separating an HCl-rich $C_{3-}$ fraction from the alkylation reactor effluent.

As yet another example, effluent refrigeration unit 126 may be retained or obtained from a conventional alkylation unit 10' having effluent refrigeration capability (see, e.g., FIG. 1B). As a further example, effluent refrigeration unit 126 may be provided de novo for conversion of a conventional alkylation unit 10 having an external refrigeration unit 26 (see, e.g., FIG. 1A). In alternative embodiments, either of conventional alkylation units 10 or 10' having external- and effluent refrigeration units, respectively, may undergo conversion to an ionic liquid catalyzed alkylation system having external refrigeration. Advantageously, as a result of the conversion of an existing alkylation unit having external refrigeration to an ionic liquid catalyzed alkylation system using effluent refrigeration, the capacity of the system may be substantially increased.

There are numerous variations on the present invention which are possible in light of the teachings herein. It is therefore understood that within the scope of the following claims, the invention may be practiced otherwise than as specifically described or exemplified herein.

What is claimed is:

1. A method for converting a sulfuric acid alkylation unit to an ionic liquid alkylation system, the method comprising:
   a) providing an ionic liquid specific sub-system comprising an ionic liquid alkylation reactor and an ionic liquid/hydrocarbon separation unit configured for separating an alkylation reactor effluent of the ionic liquid alkylation reactor into a hydrocarbon phase and an ionic liquid phase, wherein the ionic liquid/hydrocarbon separation unit comprises a primary separator vessel and an ionic liquid coalescer;
   b) connecting at least one component of the ionic liquid specific sub-system to at least one component of the sulfuric acid alkylation unit;
   c) connecting the primary separator vessel to the ionic liquid coalescer for feeding the hydrocarbon phase from the primary separator vessel to the ionic liquid coalescer; and
   d) connecting the ionic liquid coalescer to the fractionation unit for feeding the hydrocarbon phase from the ionic liquid coalescer to the fractionation unit.

2. The method according to claim 1, wherein:
   the sulfuric acid alkylation unit comprises at least one hydrocarbon feed line, and
   step b) comprises connecting the ionic liquid alkylation reactor to the at least one hydrocarbon feed line.

3. The method according to claim 1, wherein:
   the ionic liquid specific sub-system further comprises an ionic liquid feed line, and the method further comprising:
   e) connecting the ionic liquid alkylation reactor to the ionic liquid feed line.

4. The method according to claim 1, wherein the ionic liquid specific sub-system further comprises an ionic liquid/hydrocarbon injection unit in fluid communication with the ionic liquid alkylation reactor, and the method further comprising:
   f) connecting the ionic liquid/hydrocarbon injection unit to an ionic liquid feed line, and
   g) connecting the ionic liquid/hydrocarbon injection unit to at least one hydrocarbon feed line, wherein the ionic liquid alkylation reactor and the ionic liquid/hydrocarbon injection unit are co-configured for forming a mixture comprising an ionic liquid phase and a hydrocarbon phase.

5. The method according to claim 1, wherein the sulfuric acid alkylation unit includes at least one of an acid settler, an acid wash vessel, and an alkaline water wash vessel, and the ionic liquid/hydrocarbon separation unit comprises at least one of the acid settler, the acid wash vessel, and the alkaline water wash vessel.

6. The method according to claim 1, wherein the sulfuric acid alkylation unit includes a fractionation unit, and the method further comprising:
   h) modifying the fractionation unit to provide a modified fractionation unit such that the modified fractionation unit is configured for separating an HCl-rich $C_{3-}$ fraction from the hydrocarbon phase for recycling to the alkylation unit.

7. The method according to claim 1, further comprising:
   i) replacing at least one component of the sulfuric acid alkylation unit with a component comprising a Ni/Cr alloy or a Ni/Cu alloy.

8. A method for converting a conventional alkylation unit to an ionic liquid alkylation system, the conventional alkylation unit including a fractionation unit, and the method comprising:
   a) providing an ionic liquid alkylation reactor configured for ionic liquid catalyzed alkylation reactions;
   b) providing an ionic liquid/hydrocarbon separation unit comprising a primary separator vessel and an ionic liquid coalescer in fluid communication with the primary separator vessel;
   c) connecting the ionic liquid alkylation reactor to at least one component of the conventional alkylation unit; and
   d) connecting the primary separator vessel to the ionic liquid alkylation reactor for feeding an alkylation reactor effluent from the ionic liquid alkylation reactor to the primary separator vessel, wherein the primary separator vessel is configured for separating the alkylation reactor effluent into a hydrocarbon phase and an ionic liquid phase.

9. The method according to claim 8, wherein the conventional alkylation unit comprises at least one hydrocarbon feed line, and the method further comprising:
   e) providing an ionic liquid/hydrocarbon injection unit, wherein step b) comprises connecting the ionic liquid alkylation reactor to the at least one hydrocarbon feed line via the ionic liquid/hydrocarbon injection unit.

10. The method according to claim 9, further comprising:
    f) connecting the ionic liquid/hydrocarbon injection unit to an ionic liquid feed line, wherein the ionic liquid/hydrocarbon injection unit is configured for injecting an ionic liquid catalyst and at least one hydrocarbon feed into the ionic liquid alkylation reactor.

11. The method according to claim 9, wherein the ionic liquid alkylation reactor and the ionic liquid/hydrocarbon injection unit are co-configured for forming a mixture comprising a dispersed ionic liquid phase and a continuous hydrocarbon phase.

12. The method according to claim 8, wherein the conventional alkylation unit is configured for sulfuric acid catalyzed alkylation.

13. The method according to claim 8, wherein:
    the conventional alkylation unit comprises an external refrigeration unit, the ionic liquid alkylation system further comprises a heat exchanger, and the method further comprising:

g) decommissioning the external refrigeration unit;

h) providing an effluent refrigeration unit; and i) connecting the heat exchanger to the effluent refrigeration unit, wherein the heat exchanger is in thermal communication with the ionic liquid alkylation reactor for removing heat from the ionic liquid alkylation reactor.

14. The method according to claim 13, further comprising:

j) connecting the effluent refrigeration unit to the fractionation unit.

15. The method according to claim 8, further comprising:

k) modifying the fractionation unit to provide a modified fractionation unit such that the modified fractionation unit is configured for separating an HCl-rich $C_{3-}$ fraction from the hydrocarbon phase, wherein the ionic liquid alkylation system is configured for recycling the HCl-rich $C_{3-}$ fraction to the ionic liquid alkylation reactor.

16. A method for converting a sulfuric acid alkylation unit to an ionic liquid alkylation system, the sulfuric acid alkylation unit including a conventional fractionation unit, and the method comprising:

a) providing an ionic liquid alkylation reactor configured for ionic liquid catalyzed alkylation reactions;

b) providing an ionic liquid/hydrocarbon separation unit configured for separating an alkylation reactor effluent of the ionic liquid alkylation reactor into an ionic liquid phase and a hydrocarbon phase;

c) connecting the ionic liquid alkylation reactor to the ionic liquid/hydrocarbon separation unit for feeding the alkylation reactor effluent to the ionic liquid/hydrocarbon separation unit; and d) modifying the conventional fractionation unit to provide a modified fractionation unit, such that the modified fractionation unit is configured for separating an HCl-rich $C_{3-}$ fraction from at least a portion of the hydrocarbon phase for recycling to the alkylation unit.

17. The method according to claim 16, wherein the sulfuric acid alkylation unit further comprises a sulfuric acid alkylation reactor, and the method further comprising:

e) decommissioning the sulfuric acid alkylation reactor;

f) connecting the ionic liquid alkylation reactor to an ionic liquid catalyst feed line; and g) connecting the ionic liquid alkylation reactor to at least one hydrocarbon feed line.

18. The method according to claim 16, wherein:

the ionic liquid/hydrocarbon separation unit comprises a primary separator vessel and an ionic liquid coalescer in fluid communication with the primary separator vessel, step c) comprises connecting the ionic liquid alkylation reactor to the primary separator vessel, and the method further comprising:

h) before or after step d), connecting the ionic liquid coalescer to the conventional fractionation unit or to the modified fractionation unit.

19. The method according to claim 16, further comprising:

i) providing an ionic liquid catalyst regeneration unit, wherein the ionic liquid alkylation system is configured for recycling regenerated ionic liquid catalyst from the ionic liquid catalyst regeneration unit to the ionic liquid alkylation reactor.

\* \* \* \* \*